G. W. WADDELL.
FEED BAG.
APPLICATION FILED NOV. 23, 1914.

1,157,471. Patented Oct. 19, 1915.

Witnesses
H. H. Burton
S. Williamson

Inventor
George W. Waddell
By
W. W. Williamson
Attorneys

UNITED STATES PATENT OFFICE.

GEORGE W. WADDELL, OF WILKES-BARRE, PENNSYLVANIA.

FEED-BAG.

1,157,471.

Specification of Letters Patent.

Patented Oct. 19, 1915.

Application filed November 23, 1914. Serial No. 873,516.

*To all whom it may concern:*

Be it known that I, GEORGE W. WADDELL, a citizen of the United States, residing at Wilkes-Barre, in the county of Luzerne and State of Pennsylvania, have invented new and useful Improvements in Feed-Bags, of which the following is a specification.

My invention relates to new and useful improvements in feed bags, and has for its object to provide an exceedingly simple and effective device of this character which may be readily and quickly attached to or detached from the harness of an animal, and when in place will permit the animal to feed therefrom without spilling the food contained therein.

A further object of the invention is to provide a feed bag which will allow freedom of movement to the head of the animal, so that the head may be withdrawn from the bag when the animal is chewing, thus facilitating the feeding and giving greater comfort to the animal.

A still further object of the invention is to provide a feed bag which will be inexpensive in the cost of manufacture, yet strong and durable and this is accomplished by producing a metal frame to which is attached the bag of suitable textile fabric such as canvas, said frame having holding and attaching means secured thereto, whereby the bag may be fastened to any suitable portion of the harness.

Another object of the invention is to provide means for the escape of small particles of the food, dirt or other foreign matter, and to permit the passage of air into the bag during the feeding.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numeral to the accompanying drawing, forming a part of this specification, in which—

Figure 1:
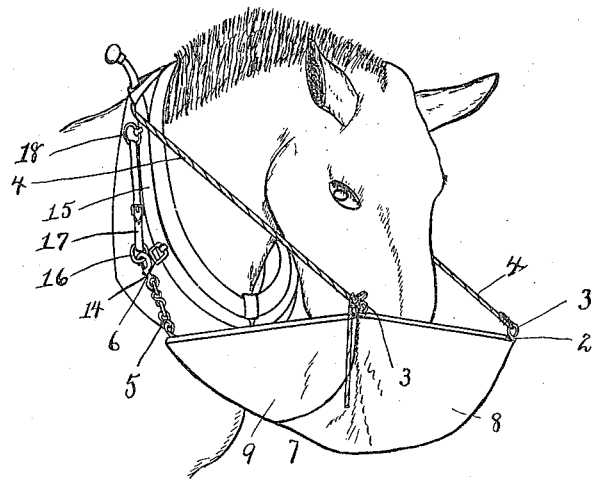
Figure 2:
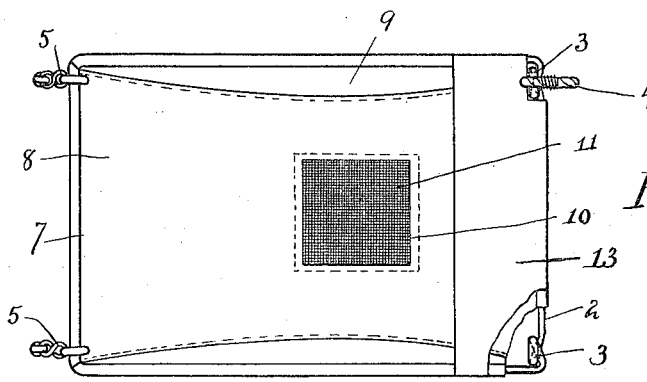
Figure 3:
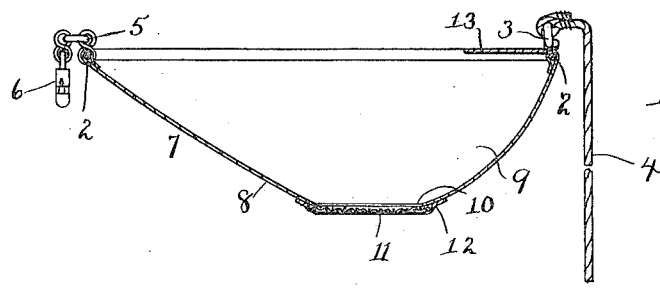

Figure 1, is a perspective view of my improved feed bag, showing it attached to the harness of an animal. Fig. 2, is an enlarged plan view of the bag, portions thereof being broken away to illustrate the construction; and Fig. 3, is a longitudinal sectional view thereof.

In carrying out my invention as here embodied 2 represents a metal frame formed from a single bar, and preferably oblong in shape. The frame at the forward corners thereof is coiled to form the eyelets 3, to one of which is secured one end of the fastening or adjusting rope 4 or its equivalent. To the rear end of the frame and adjacent each side thereof are secured the chains 5 or flexible attaching means, the free ends of said chains having snap hooks 6 or other suitable securing means fastened thereto for a purpose to be hereinafter described.

The bag 7 is formed of suitable textile fabric, such as canvas and comprises a bottom 8 and side walls 9, the lower edges of said side walls being so shaped that the bottom of the bag at the rear thereof slants at a greater angle than the front portion thereof, so that the feed contained in the bag always remains in the forward portion thereof, and within easy access of the animal's mouth.

In the bottom of the bag is formed an opening 10, across which is disposed a strip of foraminous material 11, such as a wire screen, the same being held in place in any suitable manner here shown as having its edges resting between the body of the bag, and strips 12 of the same material as the bag which are sewed thereto around each edge of the foraminous material. This permits any small particles of the food, dirt or other foreign matter to drop from the bag and also permits air to pass into the bag from the bottom thereof, thereby facilitating the breathing of the animal while eating.

As most animals throw their head upward while eating, the feed is often spilled from the bag by such movement and to overcome this and reduce the loss of feed to a minimum, I have placed a guard strip 13 at the front end of the feed bag, and this is secured to the frame in the same manner as the bag, and is preferably of the same material, so that when the animal in its upward movement of its head scatters the feed, most of it will be thrown into the space between the front portion of the bottom of the bag and the guard strip 13 afterward rolling again to the bottom of the bag.

To fasten the bag in position the snap hooks 6 are attached to some suitable portion of the animal's harness, such as the trace rings 14 carried by the harness 15, or as here shown, to the guide rings 16 through which the reins pass, and which are generally attached by the strips 17 by the rings 18 attached to the upper ends of the harness. This attaches the feed bag to the harness, and to adjust it and support it in the proper position, the rope 4 is passed over the harness or other suitable part of the harness in the same manner as a check rein, and the free end thereof is then passed through one of the eyes 3 and tied to hold the front end of the feed bag at the proper height.

The bag portion being formed of textile material, it will be understood that the same may be readily clasped or folded so that it will lie approximately in a flat plane with the frame, and may be readily stored because of the exceedingly small amount of space required, and in some cases it may be placed under the seat cushions.

Of course I do not wish to be limited to the exact details of construction as here shown, as these may be varied within the limits of the appended claims without departing from the spirit of my invention.

Having thus fully described my invention, what I claim as new and useful, is—

1. A feed bag comprising a rectangular metallic frame having the forward corners thereof coiled to produce eyelets, a bag of textile fabric suspended from the frame, a guard strip disposed across a portion of the forward end of the feed bag and secured to the frame, attaching chains provided with snap hooks secured to the rear end of the frame, and a fastening rope secured to one of the eyelets.

2. A feed bag comprising a rectangular metallic frame having the forward corners thereof coiled to produce eyelets, a bag of textile fabric suspended from the frame, a guard strip disposed across a portion of the forward end of the feed bag and secured to the frame, attaching chains secured to the rear portion of the frame, snap hooks carried by said chains and adapted to be fastened to some suitable portion of the body harness of an animal, a fastening rope secured to one of the eyelets and adapted to pass over a suitable portion of the body harness and be tied to the other eyelet for supporting the forward end of the bag.

3. In a device of the character stated an oblong frame formed from a single bar, the forward corners being coiled to produce eyelets, a bag supported by said frame comprising two sides and a bottom of textile fabric, said sides being so shaped that the rear portion of the bottom slants at a greater angle to the perpendicular than the front portion thereof, a guard strip disposed across the forward end of the bag and secured to the frame, a chain secured to the rear end of the frame adjacent each side, snap hooks secured to said chains and a rope secured to one of the eyelets and adapted to be tied to the other eyelet as shown and described.

In testimony whereof, I have hereunto affixed my signature in the presence of two subscribing witnesses.

GEO. W. WADDELL.

Witnesses:
OLGA E. FRITZ,
GRIER B. SNYDER.

Copies of this patent may be obtained for five cents each, by addressing the "Commissioner of Patents, Washington, D. C."